United States Patent
Gillett et al.

(10) Patent No.: US 8,539,046 B2
(45) Date of Patent: Sep. 17, 2013

(54) DELEGATED PRE-CONFIGURATION

(75) Inventors: Don M. Gillett, Bellevue, WA (US); Arnold N. Blinn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1294 days.

(21) Appl. No.: 11/763,518

(22) Filed: Jun. 15, 2007

(65) Prior Publication Data
US 2008/0313447 A1 Dec. 18, 2008

(51) Int. Cl.
*G06F 15/177* (2006.01)

(52) U.S. Cl.
USPC ............ 709/220; 709/218; 713/1; 713/100; 726/4

(58) Field of Classification Search
USPC ............ 709/218, 220–222; 715/733, 735, 715/744–745, 747; 717/120–121, 174–178; 713/1, 100; 726/4
See application file for complete search history.

(56) References Cited

U.S. PATENT DOCUMENTS

| | | | |
|---|---|---|---|
| 6,633,907 B1 | 10/2003 | Spencer et al. | |
| 7,103,351 B2 | 9/2006 | Chaudhari et al. | |
| 7,155,479 B2 | 12/2006 | Cover et al. | |
| 2003/0187963 A1 | 10/2003 | Tsai et al. | |
| 2005/0049886 A1* | 3/2005 | Grannan et al. | 705/1 |
| 2005/0050539 A1* | 3/2005 | Burkhardt et al. | 717/174 |
| 2005/0120106 A1 | 6/2005 | Albertao | |
| 2006/0075035 A1 | 4/2006 | Tripp | |
| 2006/0179425 A1 | 8/2006 | Scougall et al. | |
| 2007/0022187 A1 | 1/2007 | Bellinger et al. | |
| 2007/0061430 A1 | 3/2007 | Kim | |
| 2008/0155534 A1* | 6/2008 | Boss et al. | 717/178 |
| 2009/0222894 A1* | 9/2009 | Kenny et al. | 726/4 |
| 2010/0146443 A1* | 6/2010 | Zuckerberg et al. | 715/810 |

FOREIGN PATENT DOCUMENTS

WO WO2007046706 A1 4/2007

OTHER PUBLICATIONS

Alexander Keller and Heiko Ludwig, IBM Research Division, The WSLA Framework: Specifying and Monitoring Service Level Agreements for Web Services, RC22456 (WO205-171), May 22, 2002, Computer Science, pp. 1-21, Yorktown Heights, NY, http://domino.watson.ibm.com/library/cyberdig.nsf/papers/CDEDB79080F59EE285256C5900654839/$File/RC22456.pdf.

Bart Verheecke, María Agustina Cibrán, and Viviane Jonckers, "AOP for Dynamic Configuration and Management of Web Services," M. Jeckle and L-J Zhang (Eds.): ICWS-Europe 2003, LNCS 2853, pp. 137-251, 2003, Brussels, Belgium, http://www.comp.lancs.ac.uk/computing/aosd-europe/allPublications/languages/langModel/aopDynConfWebServ.pdf.

* cited by examiner

*Primary Examiner* — Oleg Survillo

(74) *Attorney, Agent, or Firm* — Shook Hardy & Bacon L.L.P.

(57) ABSTRACT

Computer-readable media, systems, and methods for delegated pre-configuration are described. In embodiments, an identification of a user is received. Further, in various embodiments, one or more pre-configuration instructions is received from a delegate. In various embodiments, one or more online service settings is processed in accordance with the one or more pre-configuration instructions. In various other embodiments an online service is presented in accordance with the processed one or more online service settings.

13 Claims, 6 Drawing Sheets

DELEGATED PRE-CONFIGURATION

BACKGROUND

Computer manufacturers and software application programmers strive to continually enhance user experience with intuitive and easy-to-use interfaces. With all the advancements in technology, however, new features and interfaces become inevitably complex and confusing to a non-tech-savvy user. For example, having mastered a messaging service from a decade ago without any subsequent progress, updating to a more modem social networking application might frustrate a user because configuration of the application may seem unduly complicated. The frustration and confusion may prevent the user from fully availing himself of the rich interactive capabilities of the application. As another example, new personal computers are often pre-configured with various applications determined by an original equipment manufacturer. The pre-configured settings may confuse a novice user unfamiliar with all the excess functionality.

Unfortunately, there is no easy and secure way for a user to delegate the pre-configuration of complex applications, services, and settings to more technical friends and family members. In the personal computer example, a user purchasing a computer is unable to have someone else pre-configure the device in a simple and customized format because the manufacturer determines pre-configurations. In the social networking example, a user is unable to delegate authority to a friend to, by way of example, create a buddy list and upload a picture.

SUMMARY

Embodiments of the present invention relate to computer readable media, systems, and methods for delegated pre-configuration. In embodiments, an identification of a user is received and one or more pre-configuration instructions is received from a delegate. Additionally, in embodiments, one or more online service settings is processed in accordance with the one or more pre-configuration instructions. In further embodiments the user is prompted to accept the pre-configuration instructions. Further, in embodiments an online service is presented according to processed settings. Other embodiments may include guidance-oriented ongoing configuration of settings.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
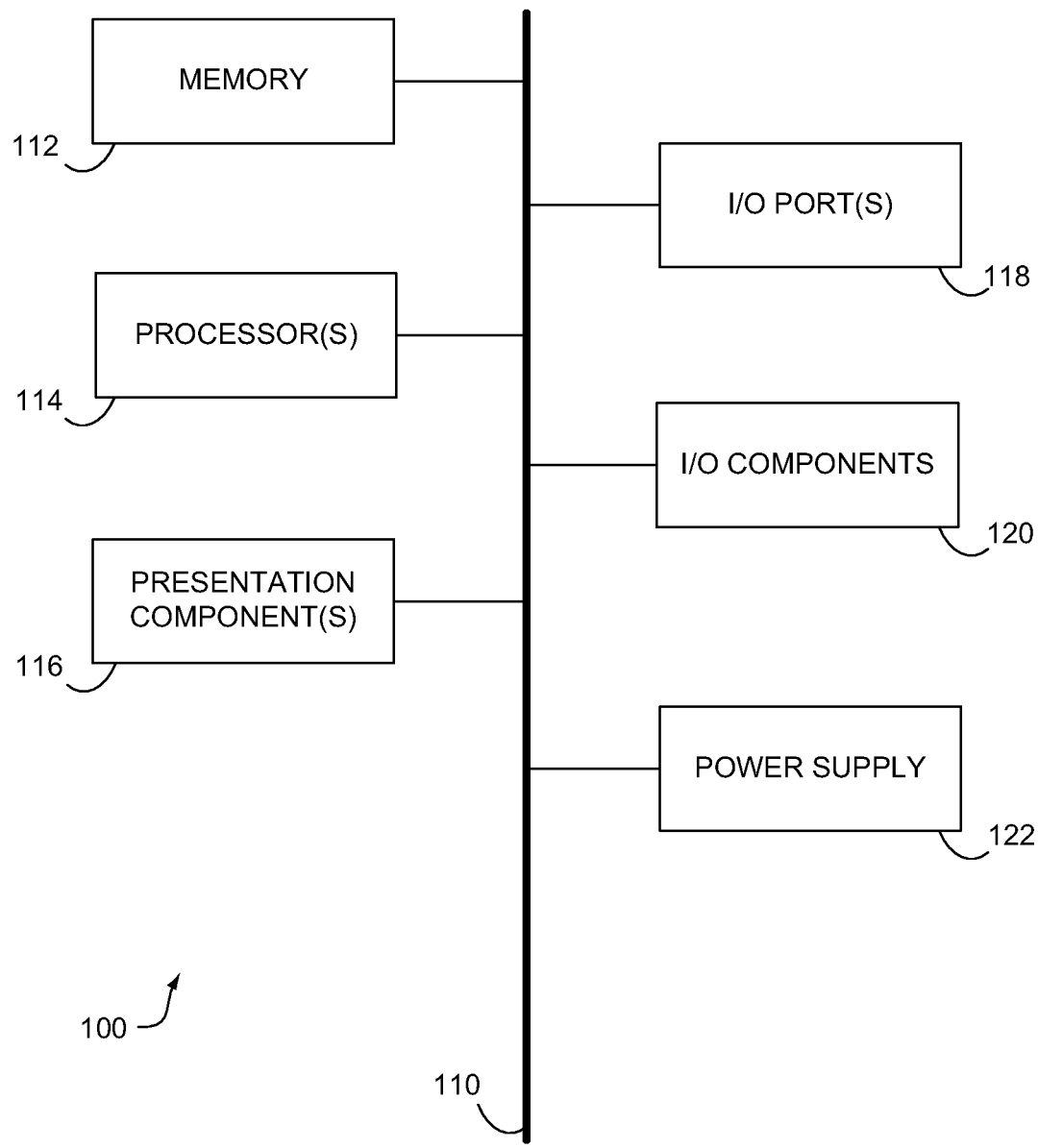
FIG. 1 is a block diagram of an exemplary computing system environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of the individual steps is explicitly described.

Embodiments of the present invention provide computer readable media, systems, and methods for delegated pre-configuration. In various embodiments, an identification of a user is received and one or more pre-configuration instructions is received from a delegate. Further, in various embodiments, one or more online service settings is processed in accordance with the one or more pre-configuration instructions. While embodiments discussed herein refer to pre-configuration instructions generally, and various types of settings, in particular, it will be understood and appreciated by one of ordinary skill in the art that embodiments are not limited to a particular pre-configuration or setting type. For example, without limitation, the pre-configuration instructions may be directed to applications existing on a personal computer, services available to a personal computer, user interface settings, application settings, service settings, and various other settings. By way of example, without limitation, as discussed herein, application settings apply not only to the applications available on the personal computer, but also how the applications appear, how the applications are accessed, and what features are available in the applications. Similarly, as discussed herein service settings apply not only to services available on the personal computer, such as online services, but also apply to how the services are displayed and what features are available with the services. Further, as discussed herein, user interface settings apply to, among other things, the arrangement of the desktop, available desktop image, available icons, menu availability, the screensaver, and various other configurable user interface settings.

Accordingly, in one aspect, the present invention is directed to a computer-implemented method for delegated pre-configuration. The method includes receiving identification of a user. The method further includes receiving one or more pre-configuration instructions from a delegate. Further, the method includes processing one or more online service settings in accordance with the one or more pre-configuration instructions.

In another aspect, the present invention is directed to a computerized system for delegated pre-configuration. The system includes an identification component configured to receive an identification of a user, an instruction component configured to receive one or more pre-configuration instructions from a delegate, and a processing component configured to process one or more online service settings in accordance with the one or more pre-configuration instructions. The system further includes a database for storing information associated with delegated pre-configuration.

In yet another embodiment, the present invention is directed to one or more computer readable media having instructions embodied thereon that, when executed, perform a method for delegated pre-configuration. The method includes receiving identification of a user. The method further includes receiving one or more pre-configuration instructions from a delegate. Further, the method includes processing one or more personal computer settings in accordance with the one or more pre-configuration instructions.

Having briefly described an overview of embodiments of the present invention, an exemplary operating environment is described below.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
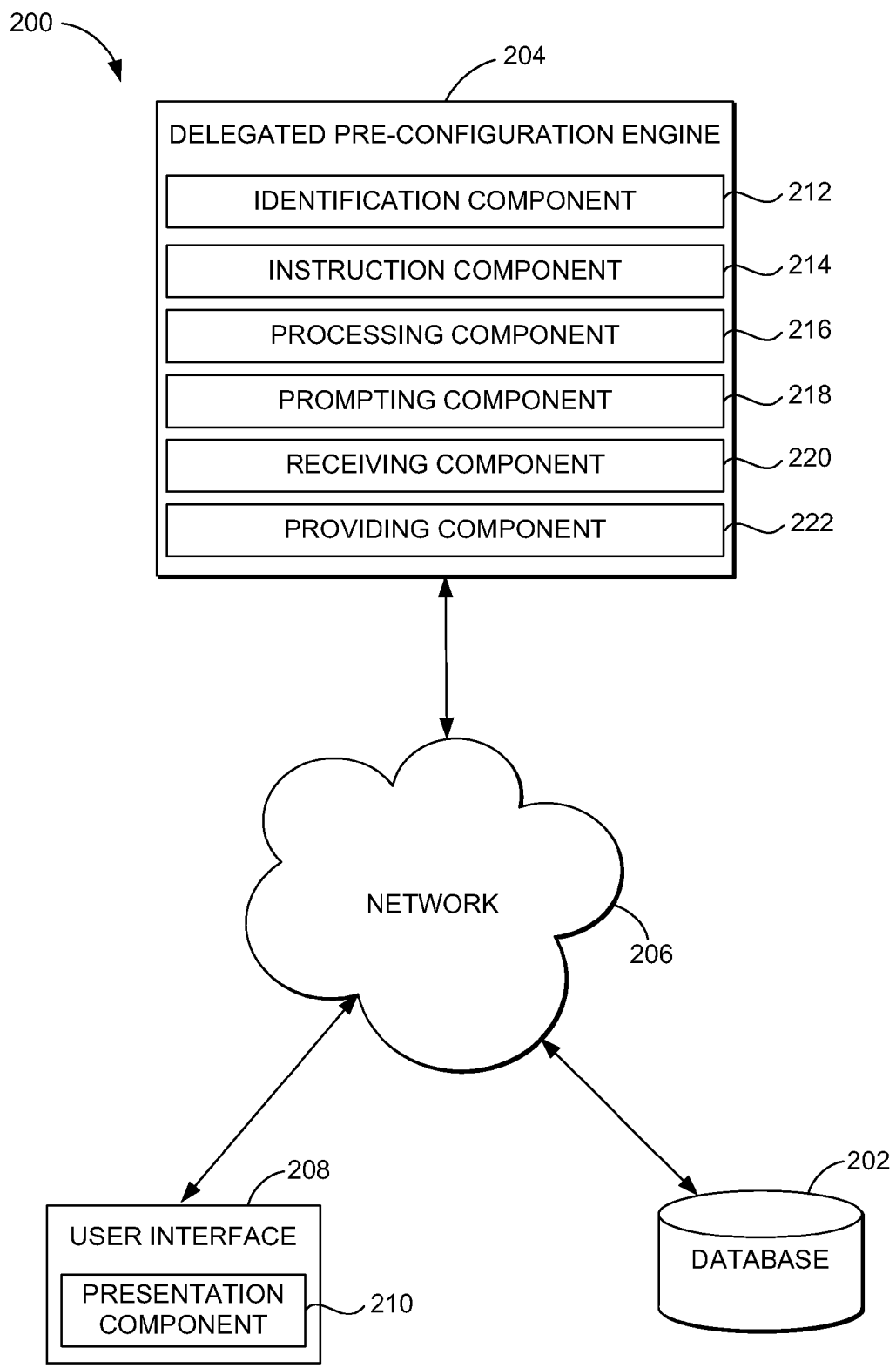
FIG. 2 is a block diagram illustrating an exemplary system for delegated pre-configuration, in accordance with an embodiment of the present invention.

Turning now to FIG. 2, a block diagram is provided illustrating an exemplary system 200 for delegated pre-configuration, in accordance with an embodiment of the present invention. The system 200 includes a database 202, a delegated pre-configuration engine 204, and a user interface 208 in communication with one another via a network 206. Network 206 may include, without limitation, one or more local area networks (LANs) and/or wide area networks (WANs). Such networking environments are commonplace in offices, enterprise-wide computer networks, intranets, and the Internet. Accordingly, network 206 is not further described herein.

Database 202 is configured to store information associated with delegated pre-configuration. In various embodiments, without limitation, such information may include user account information, information involving applications available on a personal computer, information involving services available on a personal computer, online service settings, application settings, desktop settings, other personal computer settings, and various other types of configurable user information. In various embodiments, database 202 is configured to be searchable so that the delegated pre-configuration engine 204 can retrieve pre-configuration information associated with a user. It will be understood and appreciated by one of ordinary skill in the art that the information stored in database 202 may be configurable and may include various information relevant to a delegated pre-configuration. The content and/or volume of such information are not intended to limit the scope of embodiments of the present invention in any way. Further, though illustrated as a single, independent component, database 202 may, in fact, be a plurality of databases, for instance, a database cluster, portions of which may reside on a computing device associated with delegated pre-configuration engine 204, associated with user interface 208, on another external computing device (not shown), or any combination thereof. For instance, in various embodiments, database 202 may be associated with a service being pre-configured (e.g., a social networking service), or with an intermediate service. Thus, in various embodiments, without limitation, user interface 208 may allow "plug-ins", where the data associated with the pre-configuration of an application is stored directly in a store for the application. One of ordinary skill in the art will understand and appreciate that in various embodiments of the present invention, various local and foreign databases may be used. Embodiments of the present invention are not limited to any particular database configuration and utilization of local databases, foreign databases, and combinations thereof are contemplated and within the scope of the present invention.

User interface 208 may be a type of computing device, such as computing device 100 described with reference to FIG. 1, for example, and includes at least one presentation component 210. Presentation component 210 is configured to present (e.g., display) an online service in accordance with processed one or more online settings. For example, without limitation the online service, as used herein, refer to social networking services such as Windows Live, MySpace, and FaceBook and the online settings may include configuration of "buddy" lists for the user. As will be understood and appreciated by one of ordinary skill in the art, using the online settings, the online service will present the user with a configured interface tailored to that individual user.

Delegated pre-configuration engine 204 may be a type of computing device, such as computing device 100 described with reference to FIG. 1, and includes an identification component 212, and instruction component 214, a processing component 216, a prompting component 218, a receiving component 220, and a providing component 222. Further delegated pre-configuration engine 204 is configured to operate utilizing at least a portion of the information stored in database 202.

Identification component 212 is configured to receive an identification of a user. In various embodiments, by way of example, the identification may receive instructions from a delegate to create an account for a user. For instance, in various embodiments, where a delegate already has an account with an online service, the delegate may create a sub-account for the user. In these embodiments, the delegate can pre-configure the user's online service account with configurations desired by the user. As an example, without limitation, the delegate can create a sub-account for a user and link the user to various buddies that the user may wish to correspond with. It should be appreciated that in this scheme the delegate is able to pre-configure online service settings for the user and, upon logging-in to the user's account, the online service will present an interface that has already been pre-configured by the delegate.

In various other embodiments, the user already has created a user account but seeks to delegate control of that account to a delegate. As will be understood and appreciated by one of ordinary skill in the art, this can be accomplished in a variety of ways. For instance, in various embodiments, the user may login to the user account for the online service and input a delegation. In various embodiments, the user may indicate to the online service a delegate role, identifying the scope of authority granted to the delegate. Stated differently, the user may identify the settings that the delegate will be able to configure. In various other embodiments, the delegate role will be an automatically applied default set of settings configurable by the delegate. In various embodiments, the delegate may indicate to the online service that it seeks to become a delegate for the user. For example, without limitation, in these embodiments, the user's delegate designation may merely be responding in the affirmative to a prompt asking the user to authorize the delegate. One of ordinary skill in the art will also understand and appreciate that once a user-delegate relationship has been established, there are various ways for the delegate to identify the existing account for the user (prior to submitting pre-configuration instructions). For instance, without limitation, the delegate may login to the delegate's account and be prompted that the user has designated the delegate to configure the user's account. In another example, upon receiving a delegate designation from the user, the delegate may be emailed a link and accessing the link will be the delegate's identification of the user's account. One of ordinary skill in the art will understand and appreciate that the user-delegate examples discussed herein are intended to be illustrative and by no way limit the functionality of identification component 212 to a particular functionality. Instead, it is contemplated and within the scope of the present invention that identification component 212 may function in various ways to receive an identification of a user. By way of example, without limitation, in various embodiments, identification component 212 may also be configured to allow the user to revoke delegate authorization, vitiating the user-delegate relationship.

Instruction component 214 is configured to receive one or more pre-configuration instructions from a delegate. One of ordinary skill in the art will understand and appreciate that the pre-configuration instructions may be specific settings associated with an online service or may be generic settings for a user. For example, in various embodiments, without limitation, instruction component 214 may be associated with an online service and the delegate may provide specific online service instructions by logging-in to the online service and entering pre-configuration instructions identifying online service settings for the user. By way of example, without limitation, the pre-configuration instructions may include a buddy list. In various other embodiments, instruction component 214 may be associated with a general settings service and the delegate may provide pre-configuration instructions identifying generic settings extensible across various online services. For instance, without limitation, the generic information may include user interface information such as the font size and type as well as the user's preferred color scheme and display. The generic information may also include buddy lists extensible across various online services. As will be understood and appreciated by one of ordinary skill in the art, there will be various generic settings that, once delegated, may be pre-configured by a delegate for a user. The examples discussed herein are not meant to limit the scope of the pre-configuration instructions provided by the delegate. Further, examples discussed herein are not meant to limit the scope of the present invention to any particular service. For example, without limitation, in various embodiments, the delegate may pre-configure a credit card and "one-click" purchasing options for the user.

Processing component 216 is configured to process one or more online service settings in accordance with one or more pre-configuration instructions. In various embodiments, processing component 216 may process settings specific to a particular online service. For instance, without limitation, processing component 216 may create a user profile associating the user with the pre-configuration instructions received from the delegate. The user profile will be stored in association with the online service. As will be understood and appreciated by one of ordinary skill in the art, upon logging-in to the particular online service, the online service will retrieve the user profile and apply online service settings in accordance with the pre-configuration instructions. In various other embodiments, processing component 216 may process generic setting information extensible to various online services, as previously discussed. For example, without limitation, processing component 216 may create a user profile associating the user with pre-configuration instructions and may store the user profile in association with a generic user identification. One of ordinary skill in the art will understand and appreciate that for a generic setting service to function extensibly across various online services, the user may need a universal identification and authentication. Thus, in various embodiments, without limitation, the user profile associating the user and pre-configuration instructions may be associated with a generic username and password. Use of the generic setting information will be discussed in more detail herein in regard to various other components of delegated pre-configuration engine 204. One of ordinary skill in the art will understand and appreciate that the discussion of universal identification and authentication herein also contemplates a federated login, where the user has an identity that can be used at multiple services but where a single service performs identification authentication.

Prompting component 218 is configured to prompt the user to accept the pre-configuration instructions. Thus, in various embodiments, the pre-configuration information provided by the delegate will not affect the online service settings of the user until the user accepts the settings. By way of example, without limitation, where the user has an existing online service account, where the user next logs in to the account after the delegate provides pre-configuration information, the user will be prompted to accept the delegate's instructions. In various embodiments, without limitation, where the user rejects the pre-configuration instructions, the online service settings associated with the user's account may remain unchanged. Additionally, in various embodiments, without limitation, where the user rejects the pre-configuration instructions, the user may be presented with an opportunity to revoke or restrict the delegate's authorization. As another example, without limitation, where the delegate is creating an online service account for the user, the user may be prompted to accept the pre-configuration instructions upon initial login. In various embodiments, without limitation, where the user rejects the pre-configuration instructions, the online service may incorporate default settings for the user's account. As will be understood by one of ordinary skill in the art, there are various ways to prompt the user with prompting component 218, and embodiments of the present invention are in no way limited to any particular prompting scheme. For instance, in various embodiments, without limitation, prompting component 218 may send an email to the user requesting acceptance of pre-configuration instructions. Additionally, one of ordinary skill in the art will understand and appreciate that various embodiments of the present invention may not utilize the prompting feature. For example, without limitation, in various embodiments, settings might be applied directly to the service.

Receiving component 220 is configured to receive one or more configurable settings from an online service. In various embodiments, when the pre-configuration instructions are directed to generic extensible settings associated with a general setting service, a particular online service may request settings from the general setting service. By way of example, without limitation, where a user has a universal identification and authentication associated with a general setting service and one or more online services, pre-configuration instructions may be extensible. More particularly, without limitation, the user may be associated with a catalogue of settings that are extensible for multiple online services such as the settings discussed above relating to buddy lists, display preferences, and other online service settings. In this example, where a user originates an online service account with a new online service, the online service may recognize that the user has a set of pre-configuration instructions associated with the universal identification and authentication. However, in various embodiments, not all of the pre-configuration instructions from the general setting service may be relevant to the particular online service. Thus, in various embodiments, by way of example, without limitation, the online service may provide relevant configurable settings to the general setting service that are received by receiving component 220.

Providing component 222 is configured to provide the online service with the one or more pre-configuration instructions that are in correlation with the one or more configurable settings. In various embodiments, providing component 222 will respond to the online service requesting user pre-configuration instructions by providing the relevant information. By way of example, without limitation, providing component 222 may provide the service with pre-configuration instructions directed to the user's buddy list. In this example, without limitation, pre-configuration instructions directed to credit card information may not be relevant and may not be provided by providing component 222.

It should be appreciated that delegated pre-configuration is not limited to an online service environment. Rather, it is contemplated and within the scope of the present invention that delegated pre-configuration may be used to pre-configure various aspects of a user's experience. For instance, delegated pre-configuration may be used upon purchasing a personal computer to configure the applications and services present on the personal computer. By way of example, without limitation, a delegate may communicate with an original equipment manufacturer (OEM) when purchasing a personal computer and may, in addition to requesting various hardware components and devices, provide pre-configuration instructions requesting configuration of applications and services available on the personal computer.

Further, by way of example, without limitation, the delegate may specify pre-configuration instructions directed to application settings and service settings on the personal computer. Still further, the delegate may specify pre-configuration instructions directed to the user interface on the personal computer. As will be understood and appreciated by one of ordinary skill in the art, in various embodiments of the present invention, the personal computer settings configurable by a user's pre-configuration instructions include various settings. The configurable settings range from identification of desired applications, such as an MS Office Suite, to identification of personal settings, such as a desktop wallpaper image or an Internet homepage. The examples discussed herein are intended to be illustrative and are not meant to limit the scope of embodiments of the present invention. Rather, it is contemplated and within the scope of the present invention that various pre-configuration instructions may be used to configure various aspects of a personal computer. In the OEM example discussed previously, in various embodiments, the delegate may communicate with the OEM in an online purchasing scheme. For instance, without limitation, the delegate may be prompted to input hardware preferences as well as pre-configuration instructions. In various embodiments, the OEM may actually image the personal computer in accordance with the pre-configuration instructions. In various other embodiments, by way of example, a retrieval instruction may be stored on the personal computer such that upon initial login, the personal computer accesses a server to retrieve pre-configuration instructions.

As will be understood and appreciated by one of ordinary skill in the art, while some pre-configuration instructions may only be applied once to a personal computer, others may be updateable with access to a server. For example, without limitation, pre-configuration instructions directed to application settings and service settings may be applied by the OEM or upon initial login by the user and may not be updateable (however, in various embodiments, the pre-configuration settings may be overridden by the user). In various other embodiments, without limitation, the personal computer may access a server at a pre-configured interval to retrieve new configuration instructions, if they exist. For instance, without limitation, one of the pre-configuration instructions from the delegate may be directed to the desktop wallpaper image. In various embodiments, without limitation, the desktop wallpaper image may be an updateable personal computer setting. In these various embodiments, the personal computer may be pre-configured with an instruction to access a server to retrieve a desktop wallpaper image every month. Further, in these various embodiments, the delegate may have access to the server to provide an updated desktop wallpaper image. Thus, in various embodiments, without limitation, although the personal computer was initially pre-configured in accordance with the delegate's pre-configuration instructions, some of the settings may be updatable, allowing the delegate to select new settings. The examples discussed herein are intended to be illustrative and are not meant to limit the scope of updatable personal computer settings. Rather, it is contemplated and within the scope of the present invention that various settings may be updateable.

Further, as will be understood and appreciated by one of ordinary skill in the art, in a remote desktop environment, the pre-configuration instructions may be extensible and accessible from any personal computer with access to the Internet. Stated differently, where a user's desktop information is stored remotely, the user will be able to access applications and documents from any personal computer simply by logging-in with a universal identification. In this remote desktop environment, the pre-configuration instructions associated with a user will be extensible and the interface at a non-primary computer (e.g., a computer at the local library), will have an interface in accordance with the user's pre-configuration instructions, where the user's pre-configuration instructions have been configured by a delegate.

It will be understood and appreciated by those of ordinary skill in the art that additional components not shown may also be included within any of system 200, database 202, delegated pre-configuration engine 204, and user interface 208.

Figure 3:
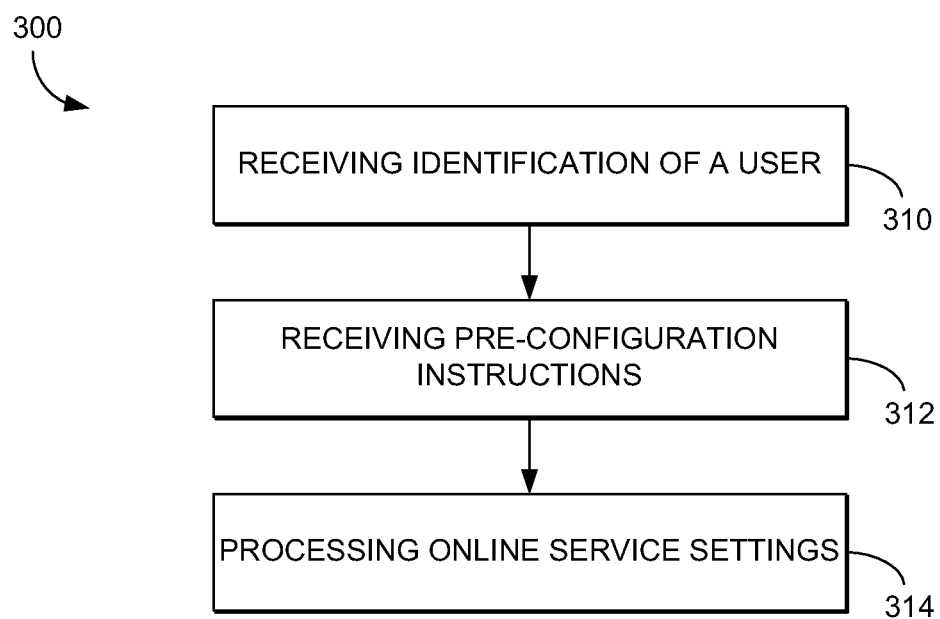
FIG. 3 is a flow diagram illustrating an exemplary method for delegated pre-configuration of online service settings, in accordance with an embodiment of the present invention.

Turning now to FIG. 3, a flow diagram of an exemplary method for delegated pre-configuration of online service settings, in accordance with an embodiment of the present invention, is illustrated and designated generally as reference numeral 300. Initially, as indicated at block 310, identification of a user is received, e.g., by identification component 212 of FIG. 2. By way of example, without limitation, the identification may be received by a delegate seeking to provide pre-configuration instructions for the user's account. In various embodiments, without limitation, the user will already have an existing online service account. In various other embodiments, without limitation the identification of the user will include instructions to create an account for the user.

Next, as indicated at block 312, pre-configuration instructions are received, e.g., by instruction component 214 of FIG. 2. As previously discussed with reference to FIG. 2, in various embodiments, without limitation, the pre-configuration instructions may be directed to a specific online service. In various other embodiments, by way of example, the pre-configuration instructions may be generic directed to a general service. By way of example, without limitation, the pre-configuration instructions may include information such as a buddy list, display preferences, and other online service preferences. Further, in various other embodiments, as previously discussed with reference to FIG. 2, the pre-configuration instructions may be directed to configuring credit card information for "one-click" purchasing. Still further, in various other embodiments, as previously discussed with reference to FIG. 2, the pre-configuration instructions may be directed to updateable settings on a personal computer.

Next, as indicated at block 314, online service settings are processed, e.g., by processing component 216 of FIG. 2. In various embodiments, without limitation, as discussed previously with reference to FIG. 2, processing online service settings may be directed to a particular online service. In various other embodiments, without limitation, processing online service settings may be directed to a generic service, which may be accessed by particular online services to retrieve settings associated with a user.

Figure 4:
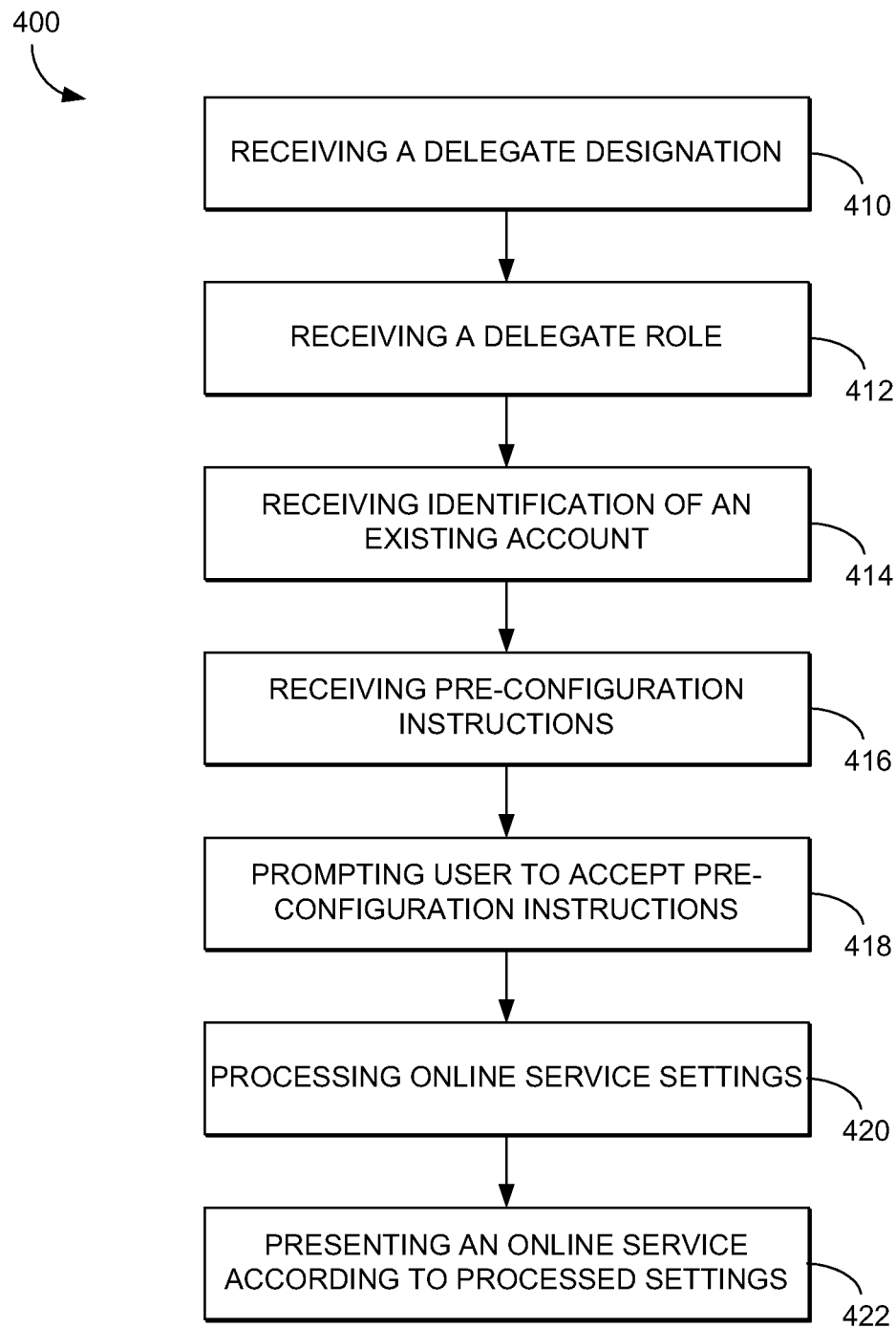
FIG. 4 is a flow diagram illustrating an exemplary method for delegated configuration of online service settings utilizing user prompting and presenting, in accordance with an embodiment of the present invention.

Turning now to FIG. 4, a flow diagram of an exemplary method for delegated configuration of online service settings utilizing user prompting and presenting, in accordance with an embodiment of the present invention, is illustrated and designated generally as reference numeral 400. Initially, as indicated at block 410, a delegate designation is received, e.g., by identification component 212 of FIG. 2. As previously discussed, the delegate designation may be provided by the user of an existing account. By way of example, without limitation, the user may login to an online service account and provide one or more delegates that the user wishes to be associated with the account. Next, as indicated at block 412, a delegate role is received. In various embodiments, the delegate role defines the scope of settings that may be configured by the delegate. For example, without limitation, the delegate role may be set by the user of an account, who grants a specified amount of pre-configuration authority to a delegate. In another example, without limitation, the delegate role may be a default for an online service (e.g., delegate can add buddies but cannot change the password).

Next, as indicated at block 414, identification of an existing account is received, e.g., by identification component 212 of FIG. 2. As previously described, in various embodiments, the delegate may initiate the identification by logging-in to the delegate's account and originating pre-configuration of the user's settings. In various other embodiments, by way of example, the delegate may receive a notification (e.g., an email) indicating the delegate designation and including a hyperlink to the user's account. There, identification of the existing account is received when the delegate selects the hyperlink.

Next, as indicated at block 416, pre-configuration instructions are received, e.g., by instruction component 214 of FIG. 2. In various embodiments, as previously stated, pre-configuration instructions may be related to various online services. For example, without limitation, the pre-configuration instructions may include a buddy list for a user. As another example, without limitation, the pre-configuration instructions may include formatting preferences for the user.

Next, as indicated at block 418, the user is prompted to accept the pre-configuration instructions, e.g., by prompting component 218 of FIG. 2. In various embodiments, the user is prompted to accept the instructions before the instructions are used to configure the user's online service account. By way of example, without limitation, upon logging-in to the user's account, the user may be presented with a message prompting the user to accept the pre-configuration instructions. In various embodiments, without limitation, the message may include an identification of each of the pre-configuration instructions the delegate provided.

Next, as indicated at block 420, online service settings are processed, e.g., by processing component 216 of FIG. 2. In various embodiments, without limitation, online service settings may be processed in association with a specific online service. In various other embodiments, without limitation, online service settings may be processed in association with a general setting service.

Next, as indicated at block 422, an online service is presented according to the processed settings, e.g., by presentation component 210 of FIG. 2. In various embodiments, once the user has accepted the pre-configuration instructions, the online service will be presented in accordance with the processed online settings and the user will encounter a configured interface. For instance, without limitation, where the pre-configuration instructions were directed to populating a buddy list for a user, upon logging-in to the user's social networking account, the user will be presented with a populated buddy list.

Figure 5:
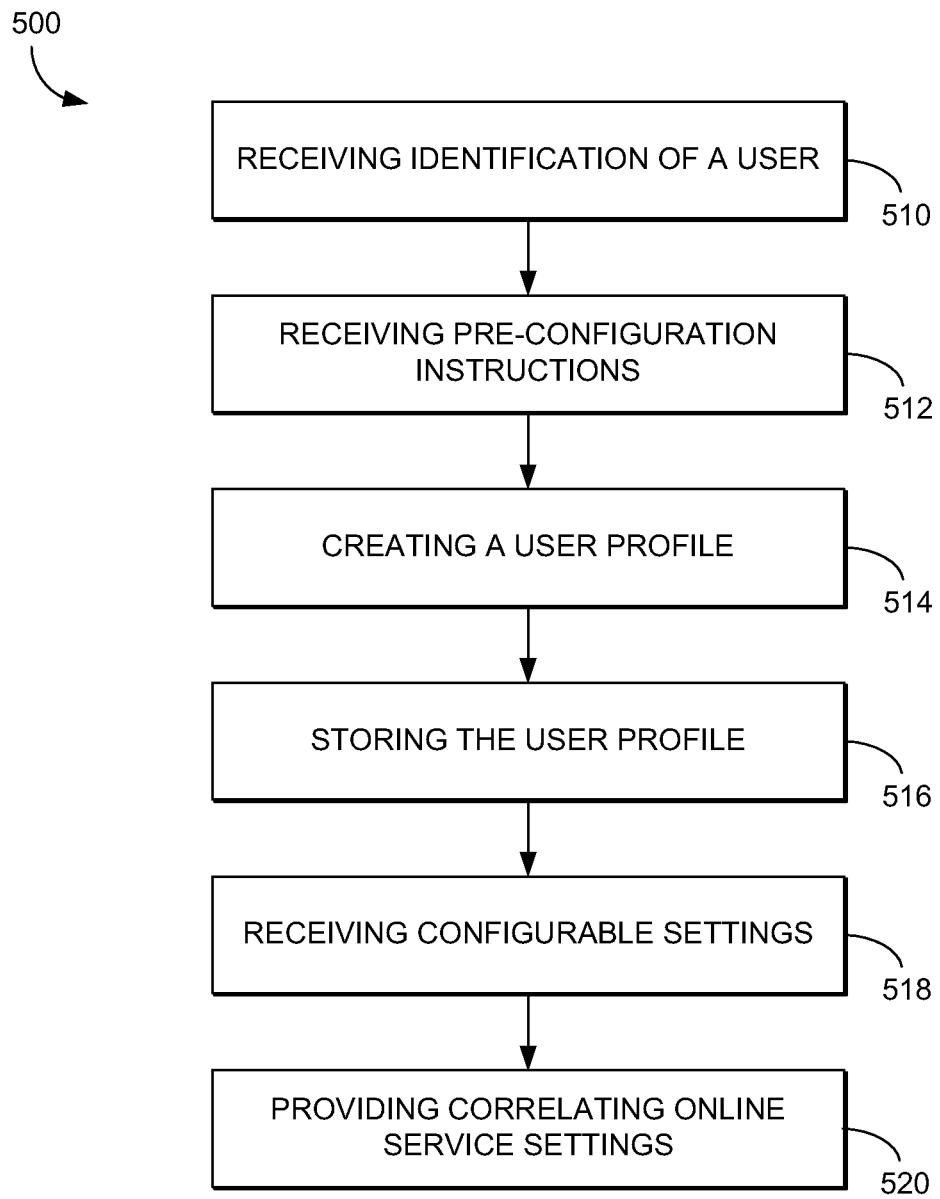
FIG. 5 is a flow diagram illustrating an exemplary method for delegated configuration of online service settings utilizing a user profile and correlating online service settings, in accordance with an embodiment of the present invention.

Turning now to FIG. 5, a flow diagram of an exemplary method for delegated configuration of online service settings utilizing a user profile and correlating online service settings, in accordance with an embodiment of the present invention, is illustrated and designated generally with the reference numeral 500. Initially at blocks 510 and 512 identification of a user is received, e.g., by identification component 212 of FIG. 2, and pre-configuration instructions are received, e.g., by instruction component 214 of FIG. 2, as previously discussed with reference to FIGS. 2 and 4. Next, at block 514, a user profile is created. In various embodiments, without limitation, the user profile associates the user with the pre-configuration instructions. Further, in various embodiments, without limitation, the user profile includes a catalogue of settings extensible for multiple online services. For example, without limitation, the user may be associated with a generic username and password. Where the pre-configuration occurs for the user, the pre-configuration may be sufficiently general to maintain applicability to various online services. The user profile is stored, as illustrated at block 516. In various embodiments, the user profile is stored on a general settings server associated with the user's universal identification and authorization.

Next, at block 518, configurable settings are received, e.g., by receiving component 220 of FIG. 2. As previously discussed with reference to FIG. 2, in various embodiments, without limitation, an online service may communicate with a general settings server to retrieve settings associated with a particular user. In various embodiments, in order to retrieve only the settings relevant to the online service, the online service will provide the general settings server with settings that are configurable for the online service. For instance, without limitation, the configurable settings may be the default delegate role discussed previously with reference to FIG. 4.

Next, at block 520, correlating online service settings are provided, e.g., by providing component 222 of FIG. 2. In various embodiments, the correlating online service settings will be the pre-configuration instructions that correlate to the configurable settings received from the online service. For example, without limitation, where a delegate creates a buddy list for a user and stores the buddy list with a general settings server, and where the user creates a new online service account, the online service account may communicate with the general settings server to retrieve the user's buddy list.

Figure 6:
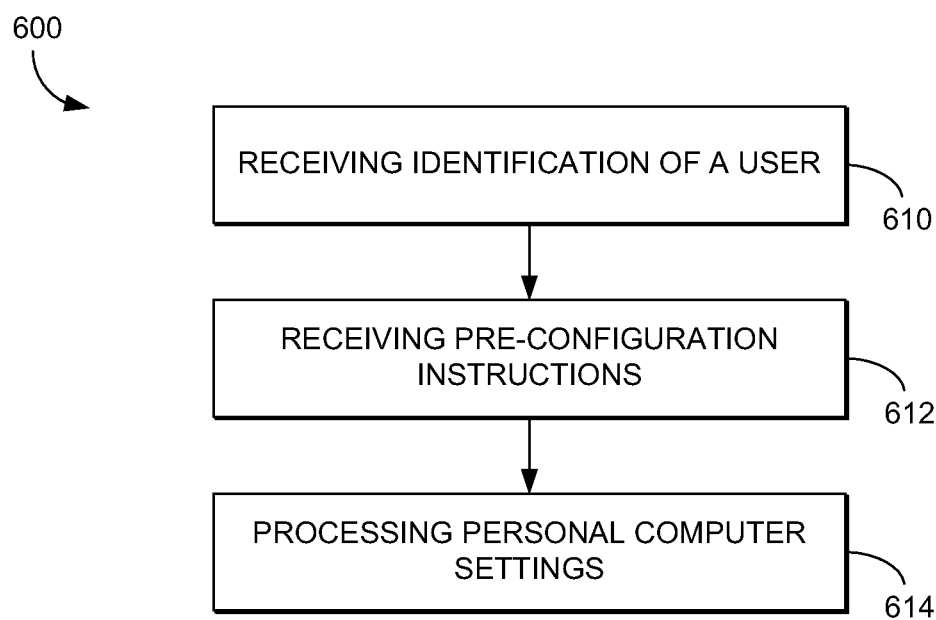
FIG. 6 is a flow diagram illustrating an exemplary method for delegated configuration of personal computer settings, in accordance with an embodiment of the present invention.

Turning now to FIG. 6, a flow diagram of an exemplary method for delegated configuration of personal computer settings, in accordance with an embodiment of the present invention, is illustrated and designated generally as reference numeral 600. Initially, at block 610, an identification of a user is received, e.g., by identification component 212 of FIG. 2. In various embodiments, as previously discussed with reference to FIG. 2, the identification may be an identification of a user's personal computer during the purchasing process. For example, without limitation, a delegate may purchase a computer on behalf of a user. By way of another example, without limitation, a delegate may identify a user's universal identification.

Next, at block 612, pre-configuration instructions are received, e.g., by instruction component 214. In various embodiments, as previously discussed with reference to FIG. 2, the pre-configuration instructions may be personal computer applications, services, settings, and other user preferences. By way of example, without limitation, the pre-configuration instructions may be directed to non-updateable settings that are placed on a personal computer upon manufacturing or initializing. As another example, without limitation, the pre-configuration instructions may include instructions directed to one or more updateable personal computer settings. For instance, without limitation, the desktop wallpaper image may be updatable and the personal computer may retrieve a desktop wallpaper image from a server, accessible to the delegate, every specified interval of time.

Next, at block 614, personal computer settings are processed, e.g., by processing component 216 of FIG. 2. In various embodiments, without limitation, the personal computer settings are stored on a personal computer. For example, the pre-configuration instructions may be received and processed by an OEM and the OEM may configure a personal computer. In various embodiments, without limitation, the pre-configuration instructions received by the OEM, e.g., at block 610, may be received in integration with an order of a personal computer. In various other embodiments, without limitation, processing personal computer settings may involve storing a retrieval instruction on a personal computer. For example, without limitation, when the computer is initialized by the user (e.g., when the personal computer is first online) the personal computer will, in accordance with the retrieval instruction, retrieve personal computer settings from a server storing the settings and the personal computer will be configured in accordance with the pre-configuration instructions. In various other embodiments, the personal computer settings may be stored in association with a universal identification of a user. For example, where a remote desktop environment exists, the personal computer settings may be associated with a user using the user's universal identification and stored on a server. In the present example, upon logging-in to a computer, the user will be presented with the user's desktop in accordance with pre-configuration instructions, regardless of the actual personal computer the user is logging-in to.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. One or more computer storage media devices storing computer-usable instructions that, when executed by one or more computing devices, cause the one or more computing devices to perform a method for delegated pre-configuration, the method comprising:
receiving an identification of a user of an online service of a plurality of online services from multiple different service providers, wherein the online service is a social networking service allowing one or more social network users to, via a network, post new messages and receive responses to posted messages in an online forum, and further wherein receiving the identification of the user comprises
receiving instructions from a delegate to create an account for the user of the online service;
receiving pre-configuration instructions from the delegate that is a second user different from the user, the delegate having received permission from the user to provide the pre-configuration instructions, wherein the pre-configuration instructions include specific settings that are applied to the social networking service of the user upon creation of the account and generic settings that are applied across the plurality of online services of the user;
processing online service settings in accordance with the pre-configuration instructions received from the delegate, wherein processing the online service settings in accordance with the pre-configuration instructions comprises:
creating a user profile associating the user with the pre-configuration instructions and storing the user profile, wherein the user profile includes a catalogue of the specific and the generic settings, and
pre-configuring the social networking service with the specific settings and the generic settings retrieved from the user profile, wherein the generic settings are pre-configured for each of the plurality of online services for which an account associated with the user is established; and
presenting the online service to the user according to the online service settings.

2. The one or more computer storage media of claim 1, wherein the method further comprises:
receiving a delegate role from the user.

3. The one or more computer storage media of claim 2, wherein the method further comprises:
prompting the user to accept the pre-configuration instructions.

4. The one or more computer storage media of claim 3, wherein the method further comprises:
presenting the user with an opportunity to revoke or restrict the delegate's authorization.

5. The one or more computer storage media of claim 1, wherein the method further comprises:
receiving one or more configurable settings from another online service of the plurality of online services;
providing the another online service with a relevant portion of the online service settings in correlation with the one or more configurable settings.

6. A computerized system for delegated pre-configuration, the system comprising:
a database that stores information associated with delegated pre-configuration; and
one or more computer processors programmed to execute:
an identification component programmed to receive an identification of a user of an online service of a plurality of online services from multiple different service providers, the identification includes instructions from a delegate to create an account for the user of the online service;
an instruction component programmed to receive pre-configuration instructions from the delegate that is a second user different from the user, the delegate having received permission from the user to provide the pre-configuration instructions, wherein the pre-configuration instructions include specific settings that are applied to the online service of the user upon creation of the account and generic settings that are applied across the plurality of online services of the user;
a processing component programmed to process online service settings in accordance with the pre-configuration instructions received from the delegate, wherein processing the online service settings in accordance with the pre-configuration instructions comprises creating a user profile associating the user with the pre-configuration instructions and storing the user profile, wherein the user profile includes a catalogue of the specific and the generic settings, and pre-configuring the online service with the specific settings and the generic settings retrieved from the user profile, wherein the generic settings are pre-configured for each of the plurality of online services for which an account associated with the user is established; and
a presentation component programmed to present the online service to the user according to the online service settings.

7. The system of claim 6, further comprising a prompting component programmed to prompt the user to accept the pre-configuration instructions.

8. The system of claim 6, further comprising:
a receiving component programmed to receive one or more configurable settings from another online service of the plurality of online services; and
a providing component programmed to provide the another online service with a relevant portion of the online service settings in correlation with the one or more configurable settings.

9. One or more computer storage media devices, having instructions stored thereon that, when executed by one or more computing devices, cause the one or more computing devices to perform a method for delegated pre-configuration, the method comprising:
receiving identification of a user of a personal computer, the identification of the user occurring prior to a purchase of the personal computer, wherein the identification of the user prior to the purchase of the personal computer is received from a delegate that is a second user different from the user of the personal computer;

receiving one or more pre-configuration instructions from the delegate, the delegate having received permission from the user to provide the one or more pre-configuration instructions; and processing one or more personal computer settings in accordance with the one or more pre-configuration instructions received from the delegate, the personal computer settings including at least one of an application setting, a service setting, and a user interface setting, wherein the one or more personal computer settings include one or more updateable personal computer settings, wherein the personal computer automatically accesses a server at a pre-configured interval to retrieve the one or more updateable personal computer settings, wherein processing the one or more personal computer settings in accordance with the one or more pre-configuration instructions comprises:
  (1) storing the one or more personal computer settings on the personal computer; and
  (2) configuring the personal computer in accordance with the one or more personal computer settings, wherein the pre-configuration instructions are accessed from a computer other than the personal computer, wherein the computer other than the personal computer is configured according to the pre-configuration instructions and in accordance with the one or more personal computer settings.

10. The computer storage media of claim 9, wherein the personal computer is configured by an original equipment manufacturer in accordance with the pre-configuration instructions.

11. The computer storage media of claim 10, wherein the one or more pre-configuration instructions are received from the delegate in integration with an order of the personal computer from the original equipment manufacturer.

12. The computer storage media of claim 9, wherein processing the one or more personal computer settings in accordance with the one or more pre-configuration instructions further comprises:
  storing a retrieval instruction on the personal computer; and
  upon initialization by the user, automatically accessing a server to retrieve the one or more personal computer settings.

13. The computer storage media of claim 9, wherein processing the one or more personal computer settings in accordance with the one or more pre-configuration instructions further comprises:
  storing the one or more personal computer settings on a server; and
  configuring the personal computer in accordance with the one or more personal computer settings each time the user logs onto the personal computer.

* * * * *